United States Patent
Finkenzeller

(10) Patent No.: US 11,326,652 B2
(45) Date of Patent: May 10, 2022

(54) SELF-ADJUSTING FRICTION CLUTCH

(71) Applicant: Schaeffler Technologies AG & Co. KG, Herzogenaurach (DE)

(72) Inventor: Marc Finkenzeller, Gengenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 369 days.

(21) Appl. No.: 16/317,935

(22) PCT Filed: Aug. 29, 2017

(86) PCT No.: PCT/DE2017/100725
§ 371 (c)(1),
(2) Date: Jan. 15, 2019

(87) PCT Pub. No.: WO2018/041302
PCT Pub. Date: Mar. 8, 2018

(65) Prior Publication Data
US 2021/0285503 A1    Sep. 16, 2021

(30) Foreign Application Priority Data

Sep. 1, 2016 (DE) .......................... 102016216583.6

(51) Int. Cl.
*F16D 13/75* (2006.01)
*F16D 13/38* (2006.01)
(Continued)

(52) U.S. Cl.
CPC ........... *F16D 13/757* (2013.01); *F16D 13/38* (2013.01); *F16D 13/70* (2013.01); *F16D 23/12* (2013.01); *F16D 2023/126* (2013.01)

(58) Field of Classification Search
CPC .. F16D 13/757; F16D 13/38–2013/565; F16D 13/70; F16D 23/12; F16D 2023/126
(Continued)

(56) References Cited

U.S. PATENT DOCUMENTS 5,944,157 A * 8/1999 Blard .................... F16D 13/757
192/70.12
6,176,360 B1 * 1/2001 de Briel ................ F16D 13/583
192/70.252
(Continued)

FOREIGN PATENT DOCUMENTS

DE    102009055894 A1    7/2010
DE    102011087386 A1    6/2012
(Continued)

*Primary Examiner* — David R Morris
(74) *Attorney, Agent, or Firm* — Kevin L. Parks

(57) ABSTRACT

A friction clutch includes a housing, an axially displaceable pressure plate, a lever system for displacing the pressure plate, a ramp system arranged between the pressure plate and the lever system, a torsion device for rotating the ramp system, and a control device. The torsion device has a spindle to drive the ramp system and a drive gear with an external profile. The control device has a fastening portion fixed to the housing and a pawl with a plurality of tongues to forming a positive interlock. At least one tongue is arranged to engage the external profile. Each tongue is separated from another tongue by a gap extending in the axial direction. At least one gap, starting from a tip of the tongue, extends in the axial direction 30% or less of a minimum distance between the tip and the fastening portion.

8 Claims, 1 Drawing Sheet

(51) Int. Cl.
*F16D 13/70* (2006.01)
*F16D 23/12* (2006.01)

(58) Field of Classification Search
USPC .......................................... 192/111.16–111.4
See application file for complete search history.

(56) References Cited

U.S. PATENT DOCUMENTS

| | | | |
|---|---|---|---|
| 6,253,897 B1 * | 7/2001 | Blard | F16D 13/757 192/111.17 |
| 6,334,520 B1 * | 1/2002 | Blard | F16C 35/02 192/111.17 |
| 6,394,251 B1 * | 5/2002 | de Briel | F16D 13/757 192/70.252 |
| 8,789,675 B2 * | 7/2014 | Ahnert | F16D 13/757 192/111.2 |
| 2013/0313065 A1 * | 11/2013 | Ahnert | F16D 13/757 192/111.1 |

FOREIGN PATENT DOCUMENTS

| | | |
|---|---|---|
| DE | 102012220611 A1 | 6/2013 |
| DE | 102012221163 A1 | 6/2013 |
| DE | 102013213901 A1 | 1/2015 |
| DE | 102014218356 B3 | 9/2015 |

\* cited by examiner

SELF-ADJUSTING FRICTION CLUTCH

CROSS-REFERENCE TO RELATED APPLICATIONS

This application is the United States National Phase of PCT Appln. No. PCT/DE2017/100725 filed Aug. 29, 2017, which claims priority to German Application No. DE102016216583.6 filed Sep. 1, 2016, the entire disclosures of which are incorporated by reference herein.

TECHNICAL FIELD

The disclosure relates to a friction clutch with a torsion device and a control device for travel-controlled wear adjustment, e.g., for motor vehicles.

BACKGROUND

Adjusting devices for travel-controlled wear adjustment for friction clutches, e.g., for motor vehicles, are known from the prior art in the automotive industry. The distance of a pressure plate from a counter-plate is continually detected in operation and, if wearing of the friction linings of the friction clutch is detected, the distance is reduced by adjusting the amount of travel. The wearing of the friction linings gives rise to a false distance between an ideal position of a lever system for actuating the pressure plate and the pressure plate. As a result, the pressure plate can be displaced only by applying greater force. In order to avoid this disadvantage, the false distance is compensated for by a ramp system arranged between the lever system and the pressure plate. The ramp system is rotated by the torsion device so that the pressure plate is shifted towards the counter-plate by the false distance sensed. The control device forms a positive interlock with the torsion device when wear-induced excess travel in excess of the closing travel is detected as the friction clutch is closing. The positive interlock is maintained until the next opening of the friction clutch when the positive interlock causes the control device to rotate the torsion device by a predefined amount. Consequently, the positive interlock is cancelled and suspended until the next wear situation arises.

Such friction clutches are disclosed by DE 10 2011 087 386 A1 and DE 10 2009 055 894 A1, to which reference is hereby made in full with regard to the construction of the friction clutch and the working of the control device and the torsion device. These in each case disclose control devices which include a spring element (here referred to as a fastening portion) and a pawl with tongues forming the positive interlock.

DE 10 2009 055 894 A1 proposes to form the control device with a multistage design, that is to say the pawl includes tongues of different length which alternately form the positive interlock with the drive gear of the torsion device. The pitch of the torsion device can thereby be of more approximate design for at least the same resolution of a wear or wear travel to be detected, and the false distance and sensing distance variables varying as a function of these.

DE 10 2011 087 386 A1 likewise proposes to form the control device with a multistage design. In this case, however, account is taken of the fact that over the wear range a shift in the axial direction occurs between the (drive) pawl and the drive gear. For this reason, the pawl includes tongues (in this case drive pawl arms) offset in the axial direction, so that over the entire wear range first the shorter and then the longer drive pawl arms form the positive interlock with the drive gear.

In the known control devices, the tongues (or drive pawl arms) are each arranged at a distance from one another, i.e., separated from one another by gaps. Starting from a first end forming the positive interlock, these gaps extend over most of the pawl. It has now emerged that the tongues, in forming the positive interlock, are compressed in the axial direction owing to their elasticity. The functioning of the wear adjustment is adversely affected by the compression of the tongue, particularly when the pressure plate lifts only slightly (on actuation of the friction clutch). This increases the wear travel required for adjustment, so that an adjustment of the friction clutch ensues only at greater time intervals. One solution to this problem, for example, would be a further reduction of the tooth base tangent length of the external profile of the drive gear. This measure is technically barely feasible, however, since an even smaller tooth base tangent length is difficult to produce and such an external profile easily becomes fouled by dirt. Furthermore, such an external profile may wear more rapidly and may be more readily damaged due to the effects of corrosion.

BRIEF SUMMARY

The disclosure relates to a friction clutch with a housing having a pressure plate, which is rotationally fixed and is displaceable to a limited degree in an axial direction towards the housing, and which can be displaced in the axial direction by a lever system. The pressure plate is supported on the housing and acted upon by an actuating system, relative to a counter-plate fixedly arranged on the housing, in so doing bracing friction linings of a clutch disk for opening and closing the friction clutch. As a function of a variation in a sensing distance between the housing and the pressure plate that arises as the friction clutch closes, a positive interlock ensues between a torsion device, which rotates a ramp system arranged between the pressure plate and the lever system, and a control device, which controls the torsion device by means of the positive interlock. The torsion device is rotated by means of the control device as the friction clutch opens.

The torsion device comprises a spindle, rotatably arranged on the pressure plate and driving the ramp system, and having a drive gear with an external profile in which a pawl of the control device engages at a predefined sensing distance by means of at least one tongue of a plurality of tongues arranged on a first end of the pawl by forming the positive interlock, and drives the torsion device as the friction clutch opens. The control device is fixed to the housing by a fastening portion extending at least in a radial direction and the pawl starting from the housing and from the fastening portion extends in the axial direction towards the drive gear.

The pawl includes a portion extending in the axial direction and a first end adjoining the portion. The first end comprises the plurality of tongues arranged next to one another in a circumferential direction, which are arranged at a distance from one another each separated by a gap extending in the axial direction. At least one gap, starting from a tip of the tongue forming the positive interlock, extends in the axial direction at most over 30% of a minimum distance between the tip and the fastening portion.

It is proposed, therefore, to shorten the gap shown in the control devices in DE 10 2011 087 386 A1 and DE 10 2009 055 894 A1, so that the stiffness of the tongues in the axial direction is increased. The wear travel required for adjustment to occur can thereby be kept as small as possible.

The pawl, starting from the fastening portion, extends in the axial direction towards the drive gear. The pawl includes a portion extending (e.g., solely) in the axial direction and a first end adjoining the portion. The first end extends, for example, in the axial direction and also in the radial direction. The at least one gap extends at least in the area of the first end and separates the tongues from one another. The tongues forming the positive interlock with the external profile may be arranged separated by the gap from the adjacently arranged tongues up to their tip forming the positive interlock. The tongues are formed by the gap arranged between them. The tongues therefore extend in the axial direction up to their respective tip.

The plurality of tongues may extend to different lengths in the axial direction. For example, a distance in the axial direction between two tongues (or between their tips) is approximately half a tooth base tangent length of the external profile of the drive gear. In an embodiment, only one tongue at a time interacts with the external profile. That is to say at any one given time only one tongue sets the drive gear in rotation via the positive interlock for adjustment of the wear.

In an embodiment, more than two tongues are provided, which are arranged at a distance from one another, each separated by a gap, wherein each gap has a length starting from the first end (or from a tip of the tongue) and along the pawl a length and wherein the plurality of gaps each have different lengths. The gaps may terminate at a common position in the axial direction. The length of the gap is in each case determined by the (tip of the) shorter of the two tongues arranged immediately adjacent to the gap. For example, the length may be determined along a surface of the tongue.

According to another embodiment, more than two tongues are provided, which are arranged at a distance from one another, each separated by a gap, wherein each gap has a length starting from the first end and along the pawl and wherein the plurality of gaps each have the same lengths. The gaps may terminate at different positions in the axial direction. In an embodiment, the portion extends solely in the axial direction and each tongue, starting from the portion, also extends in the radial direction. The one gap may extend only over the first end and up to the portion.

According to another embodiment, at least the one gap has a length starting from the first end (of the respective tip of the tongue) and along the pawl, wherein no more than 20% of the length is arranged in the portion. In an embodiment, the pawl has a minimum distance between a tip of the plurality of tongues and the fastening distance of less than 20 mm [millimeters], in particular less than 15 mm. The minimum distance may be at least 10 mm. The first end, starting from the portion and, for example, also extending in the radial direction, has an extent of at least 2 mm, and may be at least 3 mm. The extent is preferably no more than 8 mm, e.g., no more than 6 mm.

A control device for the friction clutch is furthermore proposed, having a fastening portion extending at least in a radial direction for fastening to a housing of the friction clutch, and a pawl which, starting from the fastening portion, extends in an axial direction. The pawl includes a portion extending in the axial direction portion and a first end adjoining the portion. The first end includes a plurality of tongues, arranged next to one another in a circumferential direction, which are arranged at a distance from one another each separated by a gap extending in the axial direction. At least one gap, starting from a tip of the tongue forming the positive interlock, extends in the axial direction at most over 30% of a minimum distance between the tip and the fastening portion.

A motor vehicle is furthermore proposed, including at least one friction clutch according to the disclosure for coupling a drive shaft of a motor vehicle to at least one transmission input shaft of a transmission. The explanations relating to the control device apply equally to the friction clutch and vice-versa.

BRIEF DESCRIPTION OF THE DRAWINGS

The disclosure and the technical field are explained in more detail below with reference to the figures. The figures show exemplary embodiments, to which, however, the disclosure is not limited. For example, it is to be pointed out that the figures and particularly the relative proportions shown are only schematic. The same reference numerals denote similar items. In the drawings.

DETAILED DESCRIPTION

Figure 1:
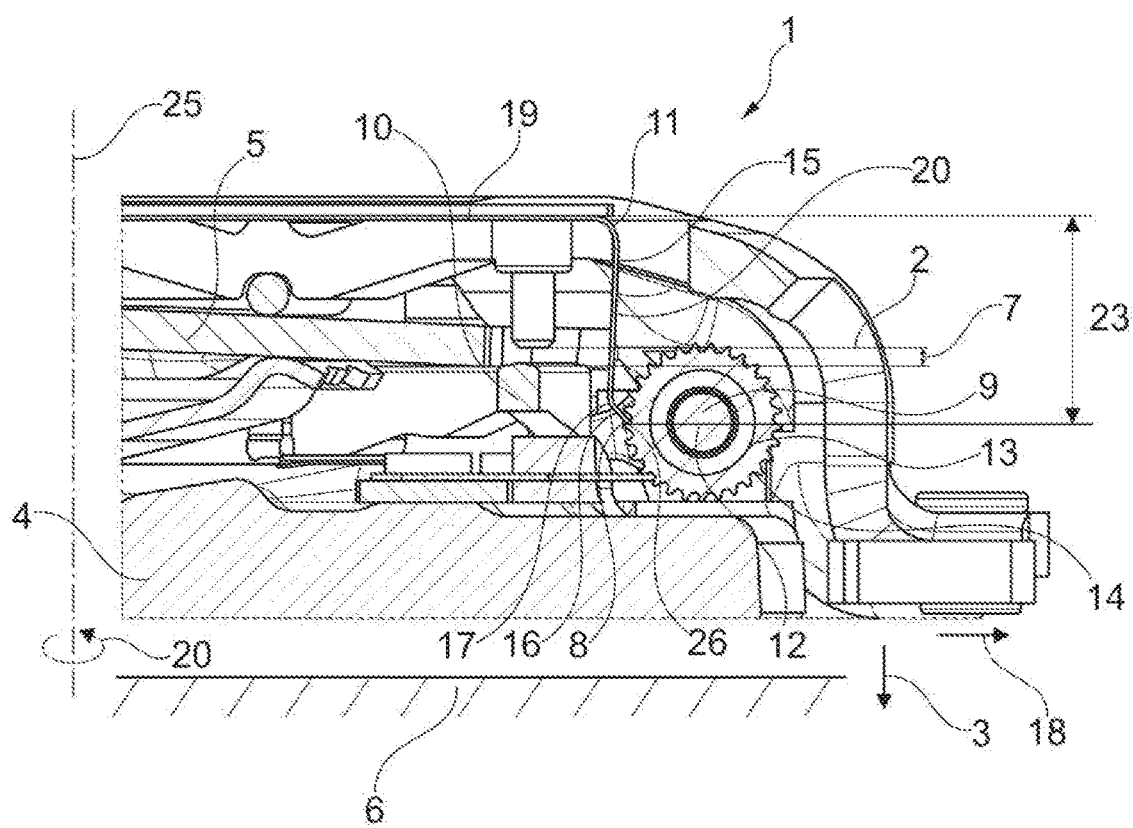
FIG. 1 shows a sectional side view of a friction clutch having an adjusting device.

FIG. 1 shows a sectional side view of a friction clutch 1 in a closed state with an adjusting device. The friction clutch 1 has an axis of rotation 25 and includes a housing 2 and a pressure plate 4, which is rotationally fixed and is displaceable to a limited degree in an axial direction 3 towards the housing 2. The pressure plate can be displaced in the axial direction 3 by a lever system 5 (comprising the disk spring shown), supported on the housing 2 and acted upon by an actuating system, in relation to a counter-plate 6 fixedly arranged on the housing 2. Displacement of the pressure plate braces friction linings of a clutch disk (not shown here, arranged, between the counter-plate 6 and the pressure plate 4) for opening and closing the friction clutch 1. As a function of a variation in a sensing distance 7 between the housing 2 (in this case the bolt connected to the housing 2) and the pressure plate 4 that arises as the friction clutch 1 closes, a positive interlock 8 ensues between a torsion device 9, which rotates a ramp system 10 arranged between the pressure plate 4 and the lever system 5, and a control device 11, which controls the torsion device 9 by means of the positive interlock 8.

The torsion device 9 is rotated by control device 11 as the friction clutch opens. The torsion device 9 includes a spindle 12, rotatably arranged on the pressure plate 4 and driving the ramp system 10 and having a drive gear 13 with an external profile 14. A pawl 15 of the control device 11 engages in the external profile 14 at a predefined sensing distance 7 by means of at least one tongue 16 of a plurality of tongues 16 arranged on a first end 17 of the pawl 15 by forming the positive interlock 8, and thus drives the torsion device 9 as the friction clutch 1 opens.

The control device 11 is fixed to the housing 2 by a fastening portion 19 extending at least in a radial direction 18. The pawl 15, starting from the housing 2 and from the fastening portion 19, extends in the axial direction 3 towards the drive gear 13. The pawl 15 includes a portion 20 extending in the axial direction 3 and a first end 17 adjoining the portion 20, wherein the first end 17 comprises the plurality of tongues 16 arranged next to one another in a circumferential direction 21, which are arranged at a distance from one another, each separated by a gap 22 (ref. FIG.

2) extending in the axial direction 3, wherein at least one gap 22, starting from a tip 26 of the tongue 16 forming the positive interlock 8, extends in the axial direction 3 over a part of a minimum distance 23 between the tip 26 and the fastening portion 19.

It is proposed, therefore, to shorten the gap 22 shown in the control devices 11 in DE 10 2011 087 386 A1 and DE 10 2009 055 894 A1, so that the stiffness of the tongues 16 in the axial direction 3 is increased. The wear travel required for adjustment to occur can thereby be kept as small as possible.

Figure 2:
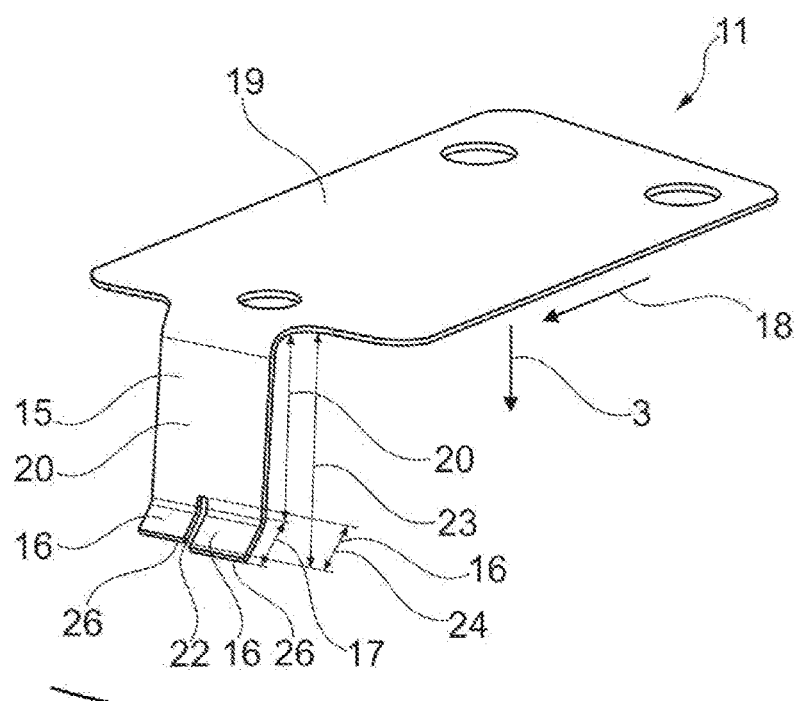
FIG. 2 shows a perspective view of a control device.

FIG. 2 shows a perspective view of a control device 11, having a fastening portion 19 extending at least in a radial direction 18 for fastening to a housing 2 of the friction clutch 1, and a pawl 15 which, starting from the fastening portion 19, extends in an axial direction 3. The pawl 15, starting from the fastening portion 19, extends in the axial direction 3 towards the tips 26 of the tongues 16. The pawl 15 includes a portion 20 extending in the axial direction 3 and a first end 17 adjoining the portion 20. The first end 17 extends in the axial direction 3 and also in the radial direction 18.

The one gap 22 here extends in the area of the first end 17 and into the area of the portion 20 and separates the tongues 16 from one another. The tongues 16 forming the positive interlock 8 with the external profile 14 of the drive gear 13 are arranged, separated by the gap 22 from the adjacently arranged tongue 16 up to their tip 26 forming the positive interlock 8. The gap 22, starting from the tip 26 of the tongue 16 forming the positive interlock 8, extends in the axial direction 3 at most over 30% of a minimum distance 23 between the tip 26 (of the shorter tongue 16) and the fastening portion 19.

The tongues 16 are formed by the gap 22 arranged between them. The plurality of tongues 16 extend to different lengths in the axial direction 3. The length 24 of the gap 22 is in each case determined by the tip 26 of the shorter of the two tongues 16 arranged immediately adjacent to the gap 22. Here the one gap 22 has a length 24 starting from the first end 17 (that is to say of the respective tip 26 of the tongue 16) and along the pawl 15, wherein less than 20% of the length 24 is arranged in the portion 20.

LIST OF REFERENCE NUMERALS 1 friction clutch
2 housing
3 axial direction
4 pressure plate
5 lever system
6 counter-plate
7 sensing distance
8 positive interlock
9 torsion device
10 ramp system
11 control device
12 spindle
13 drive gear
14 external profile
15 pawl
16 tongue
17 first end
18 radial direction
19 fastening portion
20 portion
21 circumferential direction
22 gap
23 distance
24 length
25 axis of rotation
26 tip

The invention claimed is:

1. A friction clutch comprising:
an axis;
a housing;
a pressure plate rotationally fixed and axially displaceable towards the housing;
a counter plate fixedly arranged on the housing;
a clutch disc comprising friction linings;
a lever system, supported on the housing, for displacing the pressure plate relative to the counter plate to clamp or unclamp the friction linings to close or open the friction clutch;
an actuating system for acting on the lever system;
a ramp system arranged between the pressure plate and the lever system;
a torsion device for rotating the ramp system when the friction clutch opens, the torsion device comprising:
a spindle rotatably arranged on the pressure plate to drive the ramp system; and,
a drive gear including an external profile; and,
a control device for controlling the torsion device with a positive interlock depending on a sensing distance between the housing and the pressure plate when the friction clutch closes, the control device comprising:
a fastening portion fixed to the housing and extending in a radial direction; and,
a pawl including:
a portion extending from the fastening portion in an axial direction towards the drive gear;
a first end adjoining the portion; and,
a plurality of tongues disposed at the first end to form the positive interlock, wherein:
at least one tongue of the plurality of tongues is arranged to engage the external profile at a predefined sensing distance to drive the torsion device as the friction clutch opens;
each one of the plurality of tongues is arranged next to another one of the plurality of tongues in a circumferential direction;
each one of the plurality of tongues is separated from another one of the plurality of tongues by a gap extending in the axial direction; and,
at least one gap, starting from a tip of the at least one tongue of the plurality of tongues, extends in the axial direction 30% or less of a minimum distance between the tip and the fastening portion.

2. The friction clutch as claimed in claim 1, wherein each of the plurality of tongues extends to a different length in the axial direction.

3. The friction clutch of claim 1 wherein only one tongue of the plurality of tongues engages the external profile at a given time.

4. The friction clutch as claimed in claim 1, wherein the plurality of tongues comprises at least three tongues and a length of each gap between pairs of tongues is different.

5. The friction clutch of claim 1, wherein the plurality of tongues comprises at least three tongues and a length of each gap between pairs of tongues is equal.

6. The friction clutch of claim 1, wherein the portion extends solely in the axial direction and each tongue, starting from the portion, also extends in the radial direction.

7. The friction clutch as claimed in claim 6, wherein at least the one gap extends only over the first end and up to the portion.

8. The friction clutch as claimed in claim 6, wherein at least the one gap has a length starting from the first end and along the pawl, wherein no more than 20% of the length is arranged in the portion.

\* \* \* \* \*